United States Patent [19]

Pavlak

[11] Patent Number: 5,231,766
[45] Date of Patent: Aug. 3, 1993

[54] APPARATUS AND METHOD FOR EXAMINING THE EVENNESS OF AN END OF A PIPE

[76] Inventor: Ronald M. Pavlak, 1063 Kirkwood Dr., Eagan, Minn. 55123

[21] Appl. No.: 971,662

[22] Filed: Nov. 4, 1992

Related U.S. Application Data

[63] Continuation of Ser. No. 660,695, Feb. 25, 1991, abandoned.

[51] Int. Cl.$^5$ .............................................. G01B 5/28
[52] U.S. Cl. ...................................... 33/529; 33/533; 33/535
[58] Field of Search ................. 33/481, 529, 533, 535, 33/465, 471, 474, 549

[56] References Cited

U.S. PATENT DOCUMENTS

| | | | |
|---|---|---|---|
| 1,148,196 | 7/1915 | Simmons | 33/481 |
| 1,565,695 | 12/1925 | Webster | 33/535 |
| 2,461,783 | 2/1949 | Stark | 33/529 |
| 3,149,422 | 9/1964 | McBroome | 33/529 |
| 3,245,201 | 4/1966 | Richardson | 33/529 |
| 4,497,119 | 2/1985 | Dearman | 33/529 |
| 4,517,745 | 5/1985 | Hare | 33/535 |
| 4,604,813 | 8/1986 | Kawanami et al. | 33/529 |

Primary Examiner—Thomas B. Will
Attorney, Agent, or Firm—Merchant, Gould, Smith, Edell, Welter & Schmidt

[57] ABSTRACT

A pipe square apparatus and method for facing off the rough cut ends of a pipe. The pipe square apparatus comprising a planar reference surface; and alignment member for aligning the planar reference surface perpendicular to an axis of the pipe. An alternative embodiment of the pipe square apparatus includes an additional arrangement for pivoting the planar reference surface relative to the alignment member, the planar reference surface being locked in any one of a plurality of pivotal positions. The method for facing off the rough ends of the pipe includes cutting the pipe so that the pipe has an axial end; placing the pipe square apparatus on the pipe, the pipe square apparatus having a planar reference surface and alignment member for aligning the planar reference surface perpendicular to an axis of the pipe. The apparatus positioned so that the alignment member is parallel to the axis of the pipe and the planer reference surface abuts the axial end of the pipe. After the pipe square is in position, the person inspects the gaps and variations between the axial end of the pipe and the planer reference surface and then trims the axial end until there are no gaps.

7 Claims, 2 Drawing Sheets

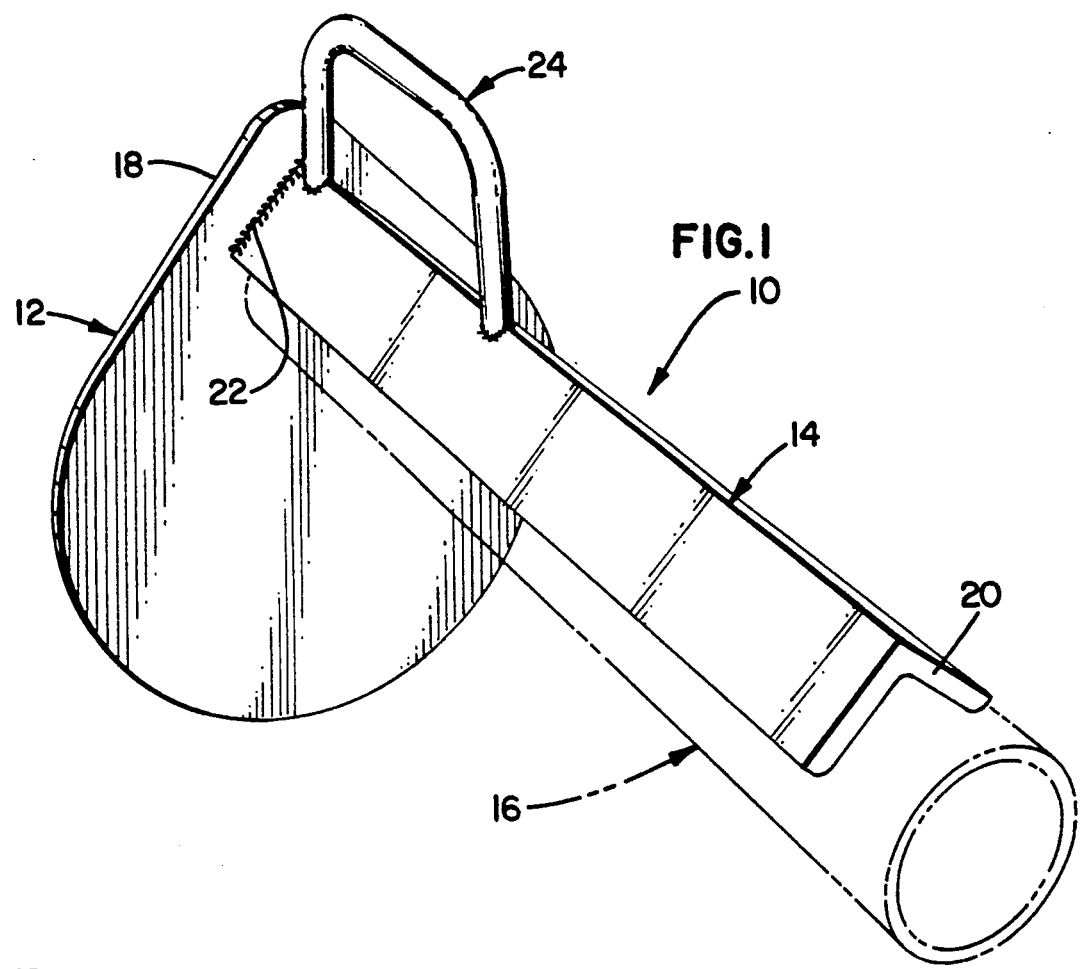
FIG. 1
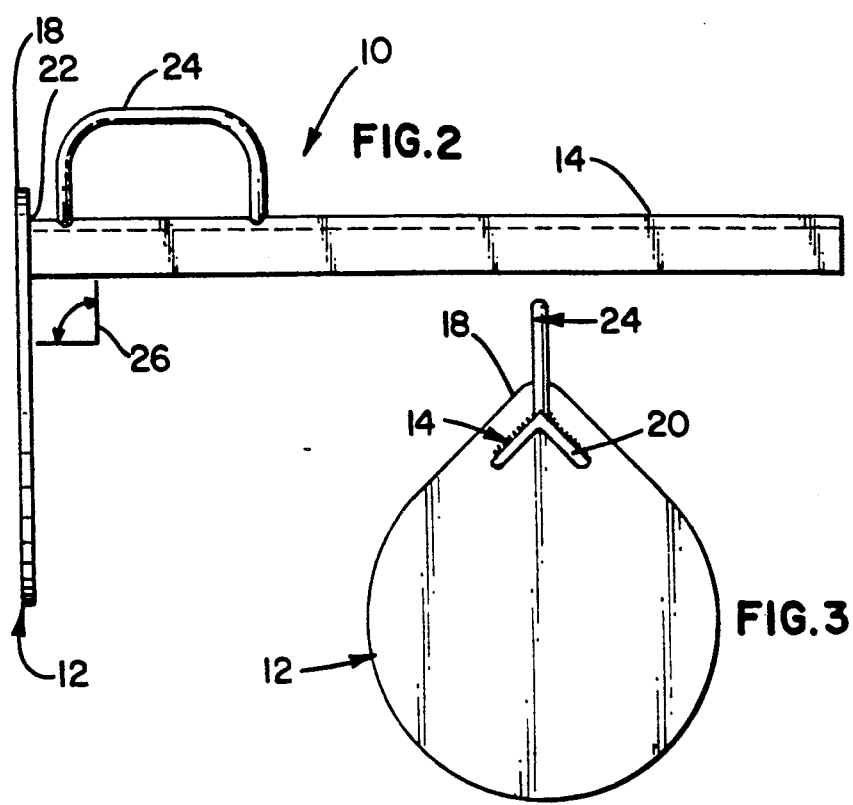
FIG. 2
FIG. 3

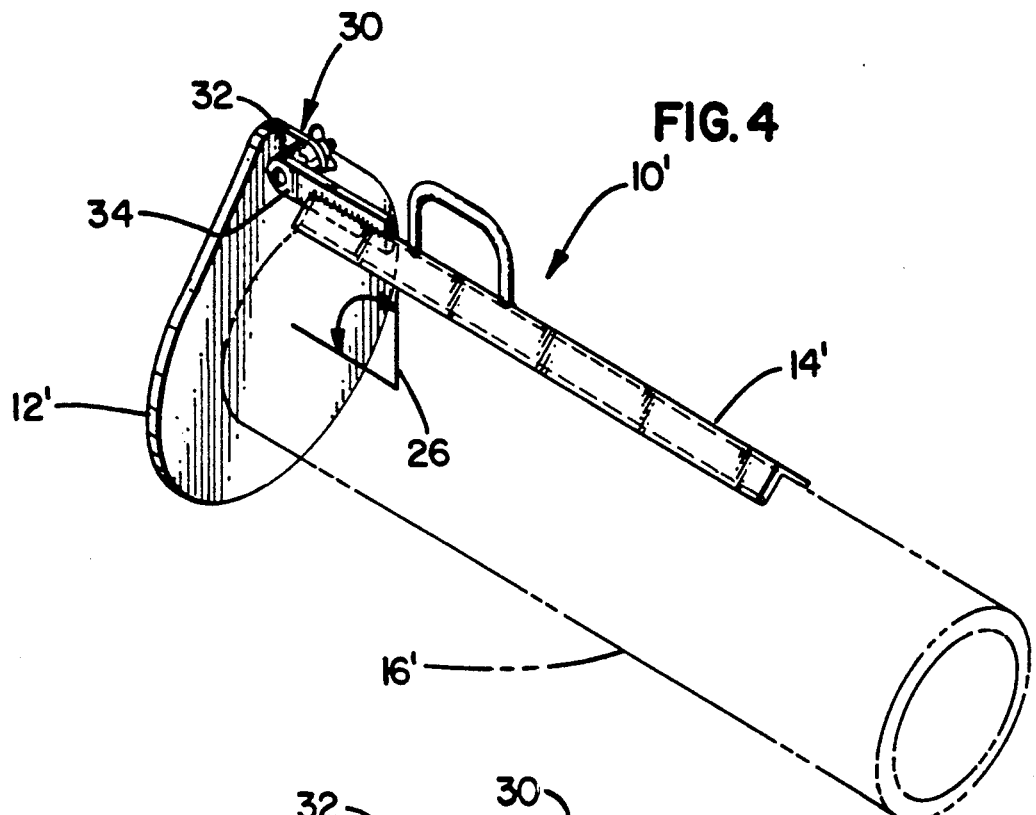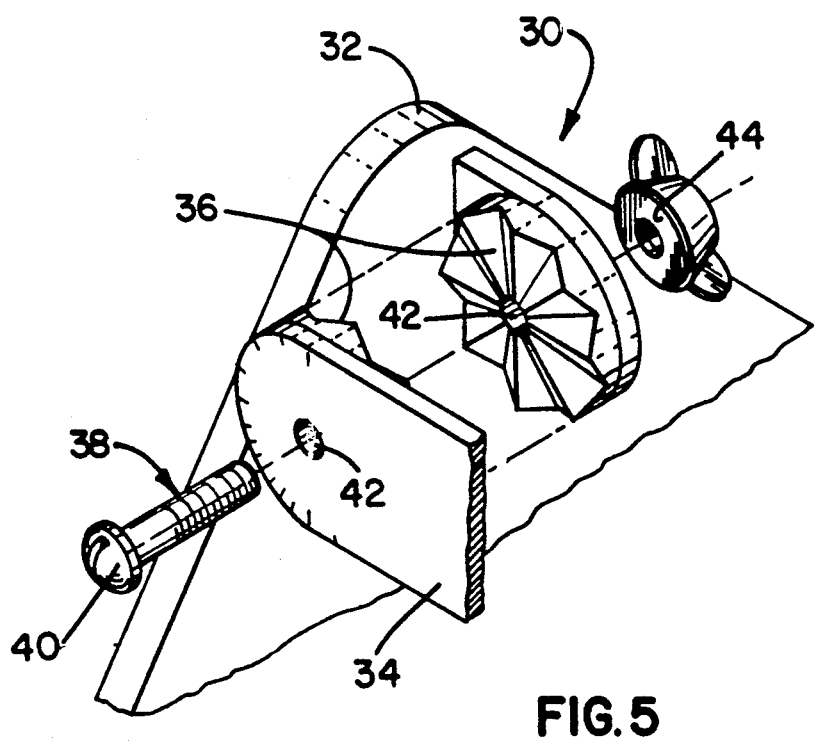

APPARATUS AND METHOD FOR EXAMINING THE EVENNESS OF AN END OF A PIPE

This is a continuation of U.S. patent application Ser. No. 07/660,695, filed Feb. 25, 1991 now abandoned.

FIELD OF THE INVENTION

This invention relates to the field of pipe fitting and more particularly to an apparatus and a method for examining the evenness of an end of a pipe.

BACKGROUND OF THE INVENTION

In preparing to weld two pipes to one another, or one pipe to a fitting, it often is necessary to face off each end of the pipes so that the ends of the pipes are even. This is necessary because if the ends of the pipes are uneven, it will be difficult and more time consuming to weld the ends together. Further, if the ends are uneven, the joint where the two pieces of pipe are welded together will be of poor quality. When the uneven ends of the pipe are welded together, the joint will expand or contract unevenly due to the unevenness of the heat generated during the welding process. This will cause the pipes to pull out of position which effects the quality of the joint, the flow of the fluid through the pipes as well as the appearance of the joint.

Thus, when pipe fitters or other persons cut pipe, it is necessary to determine whether the end of the pipe has been cut evenly. It is important to have the end of the pipe evenly cut because when two pieces of pipe are welded together, the joint is of better quality if the ends of the pipe are even.

Currently, in order to determine whether the end of the pipe has been evenly cut, a person in the pipe fitting field uses a two step procedure involving a standard carpenter's framing square and a large flat grinding disc which are used in conjunction with a hand-held grinder. Using this method, a person alternates between the framing square and the large disc to perform the visual inspection of the end of the pipe. This method does not provide a very accurate procedure for determining the evenness of the pipe end because it requires the person to alternate between the framing square and the disc. In addition, this method does not show the person exactly where the pipe end needs to be ground down to become square and faced up evenly. Furthermore, this method is not efficient because it requires the person to perform a series of steps alternating between the framing square and the disc.

Thus, there exists a long and unfilled need for an apparatus and method which will provide a one step method for examining the evenness of an end of a pipe which is more accurate and more efficient to use.

SUMMARY OF THE INVENTION

Accordingly, it is an object of the invention to provide an apparatus and method for examining the end of a pipe for total circumferential evenness and squareness.

It is a further object of the invention to provide a one step method and apparatus for facing off an end of a pipe.

In order to achieve these and other objects of the invention, an apparatus for determining the evenness of an end of a pipe according to one embodiment of the invention includes a planer reference surface; and alignment means for aligning the planer reference surface perpendicular to an axis of the pipe.

An alternative embodiment of an apparatus for determining the evenness of an end of a pipe includes a planer reference surface; alignment means for aligning the planer reference surface perpendicular to an axis of the pipe, the alignment means being attached to the planer reference surface; and means for pivoting the planer reference surface relative to the alignment means, the planer reference surface being locked in any one of a plurality of pivotal positions, the pivoting means being disposed between the planer reference surface and the alignment means.

The method for achieving these and other objects of the invention includes cutting the pipe so that the pipe has a terminal end; placing the pipe square apparatus on the pipe, the pipe square apparatus having a planer reference surface and alignment means for aligning the planer reference surface perpendicular to an axis of the pipe. The apparatus positioned so that the alignment means is parallel to the axis of the pipe and the planer reference surface abuts the terminal end of the pipe. After the pipe square is in position, a person inspects the gaps and variations between the terminal end of the pipe and the planer reference surface and then trims the terminal end until there are no gaps.

These and various other advantages and features of novelty which characterize the invention are pointed out with particularity in the claims annexed hereto and forming a part hereof. However, for a better understanding of the invention, its advantages, and the objects obtained by its use, reference should be made to the accompanying descriptive matter, in which there is illustrated and described preferred embodiments of the invention.

BRIEF DESCRIPTION OF THE DRAWINGS

FIG. 1 is an elevated perspective view of a preferred embodiment of a pipe square according to this invention, shown in use with a pipe indicated in phantom.

FIG. 2 is an elevated side view of the embodiment of the pipe square shown in FIG. 1.

FIG. 3 is an end view of the embodiment of the pipe square shown in FIG. 2.

FIG. 4 is an elevated perspective view of a second embodiment of a pipe square, shown in use with a pipe indicated in phantom.

FIG. 5 is an enlarged exploded perspective view of a portion of the embodiment of the pipe square shown in FIG. 4, with portions shown in cross section.

DESCRIPTION OF THE PREFERRED EMBODIMENT

In referring to the figures, like parts are indicated by the same reference numerals in the different views.

Referring to FIG. 1, the present invention a pipe square 10 according to a preferred embodiment of the invention comprises a planer reference surface 12 and an alignment member 14 which is attached to the planer reference surface 12. The pipe square 10 is used to determine the evenness of a cut of an end of a pipe 16, shown in phantom lines in FIG. 1. While it is recognized that the pipe 16 may be in any shape, generally, the pipe 16 is cylindrical.

The planer reference surface 12 may be of any shape and is generally sized to cover the end of the pipe 16. In the preferred embodiment shown in FIG. 1, the planer reference surface 12 is generally circular in shape. Preferably, the reference surface 12 has an attachment portion 18 extending outward from the reference surface 12 in the same plane as the reference surface 12. In the preferred embodiment shown in FIG. 1, the attachment portion 18 is triangular in shape.

The alignment member 14 is longitudinal in length and is shaped so that it centers the pipe square 10 on the longitudinal axis of the pipe 16. Generally, the alignment member 14 has two spaced apart parallel edges which lie in a plane. In the preferred embodiment, the alignment member 14 has a trough-like or V-shaped cross section 20, as shown in FIG. 3. It is recognized, however, that the alignment member 14 may be of any shape so that the pipe square 10 is centered on longitudinal axis the pipe 16.

One end 22 of the alignment member 14 is attached at a desired angle 26 to the attachment portion 18 of the reference surface 12. By attaching the alignment member 14 to the attachment portion 18 of the reference surface 14, the minimum area of the reference surface 12 is used for attachment of the alignment member 14 thereby allowing the maximum portion of the reference surface 12 to be available for use in covering the end of the pipe 16.

The desired angle 26 of attachment between the alignment member 14 and the planar reference surface 12 corresponds to the angle of the cut end of the pipe relative to the longitudinal axis of the pipe. In the preferred embodiment shown in FIGS. 1 and FIG. 2, the pipe is cut at a ninety degree angle and correspondingly, the alignment member 14 is attached to the attachment portion at approximately a ninety degree angle.

Again, referring to FIG. 1 and FIG. 2, the preferred embodiment of pipe square 10 includes a handle portion 24 which is mounted on the side of the alignment member 14 which is away from the pipe 16.

Referring now to FIG. 4, there is shown an alternative embodiment of a pipe square 10'. The embodiment in FIG. 4 has a planer reference surface 12' which is substantially the same as the planer reference surface 12 of the embodiment shown in FIG. 1. Pipe square 10' also has an alignment member 14' for aligning the planer reference surface perpendicular to an axis of pipe 16'. Alignment member 14' is also substantially similar to the alignment member 14 shown in FIG. 1. The alignment member 14' is attached to the planar reference surface 12' at the desired angle 26' of ninety degrees.

The alternative embodiment shown in FIG. 4 and in greater detail in FIG. 5, also includes a pivot arrangement 30. A portion 32 of pivot arrangement 30 is attached to the planer reference surface 12' and another portion 34 of pivot arrangement 30 is attached to alignment member 14'. Each portion 32 and 34 of pivot member 30 has complimentary surfaces 36 which matingly engage the planer reference 12' surface relative to the alignment member 14'. The complimentary surfaces 36 inhibit undesired movement in the pivot arrangement 30. Fastening structure 38 is provided to connect portions 32 and 34 to allow angular adjustment of alignment member 14' with respect to the planar reference surface 12'. That is, the angular position of alignment member 14' with respect to the planar reference surface 12' can be selected by uncoupling fastening structure 38, moving portions 32 and 34 apart, turning them to the desired position and recoupling the fastening structure 38. In the alternative preferred embodiment shown in FIGS. 4 and 5, the fastening structure 38 includes a bolt 40 extending through aligned apertures 42 and secured by a wing nut 44. Thus the reference surface 12' is locked in any one of a plurality of pivotal positions relative to the planar reference surface 12'. This alternative embodiment which includes the pivot arrangement 30 allows the pipe square 10' to be adjusted to a variety of angles so that it may be used with pipes which have different angles.

Both the preferred embodiment of the pipe square 10 shown in FIG. 1 and the alternative embodiment 10' shown in FIG. 4 are formed from aluminum. It is recognized; however, that any rigid material may be used.

In operation, the pipe square 10 is used to determine the evenness of a cut end of a pipe 16. If the end of the pipe is uneven, it is faced off. Generally, the method includes cutting the pipe so that the pipe 16 has a terminal end; placing the pipe square 10 in accordance with the preferred embodiment on the pipe whereby the alignment means 14 is parallel to the longitudinal axis of the pipe and the reference surface 12 is perpendicular to the center axis of the end of the pipe. The apparatus positioned so that the alignment means is parallel to the axis of the pipe and the reference surface abuts the terminal end of the pipe. After the pipe square is in position, a person inspects the gaps and variations between the terminal end of the pipe and the reference surface and then trims the terminal end until there are no gaps.

It is apparent that while the pipe square 10 or 10' is designed for use on pipe, the same may be employed for other means as well without departing from the spirit of the invention.

Furthermore, it is to be understood, however, that even though numerous characteristics and advantages of the present invention have been set forth in the foregoing description, together with details of the structure and function of the invention, the disclosure is illustrative only, and changes may be made in details, especially in matters of shape, size and arrangement of parts within the principles of the invention to the full extent indicated by the broad general meaning of the terms in which the appended claims are expressed.

I claim:

1. An apparatus for determining the evenness of cut of an end of a pipe comprising:

a planar reference surface for abutting the end of the pipe; alignment means for aligning the planar reference surface perpendicular to an axis of the pipe, the alignment means directly attached to and abutting the planar reference surface at a point of attachment;

the alignment means including at least two spaced apart generally parallel support edges extending perpendicularly and straight from said planar surface with an unobstructed spacing between said edges to accommodate one of a plurality of pipes of different diameter laying against said edges with axes of the pipes generally parallel to the support edges; and the planar surface being flat and substantially solid in an area sized to oppose an end of any one of said plurality of pipes laying against said edges.

2. The apparatus according to claim 1 further including a handle means attached to the alignment means for positioning and carrying the apparatus.

3. The apparatus according to claim 1 wherein the alignment means is a V-shaped longitudinal member having one end attached to the reference surface.

4. The apparatus according to claim 1 wherein said apparatus is formed from aluminum.

5. An apparatus for determining the evenness of cut of an end of a pipe comprising:
- a planar reference surface for abutting the end of the pipe;
- alignment means secured to said planar reference surface at a point of attachment;
- the alignment means including at least two spaced apart generally parallel support edges with an unobstructed spacing therebetween to accommodate one of a plurality of pipes of different diameter laying against said edges with axis of the pipes parallel to said edges;
- the planar surface being flat and substantially solid in an area sized to oppose an end of any one of said plurality of pipes laying against said edges; and
- means for pivoting the planar reference surface relative to the alignment means at said point of attachment, wherein the planar reference surface being locked in any one of a plurality of pivotal positions, the pivoting means being disposed between the planar reference surface and the alignment means.

6. The apparatus according to claim 5 further including a handle means attached to the alignment means for positioning and carrying the apparatus.

7. A method for facing off an end of a pipe comprising the steps of:
- cutting the pipe so that the pipe has an axial end;
- placing an apparatus for determining the evenness of cut of the axial end on the pipe where the apparatus includes a planar reference surface for abutting the axial end of the pipe, the planar reference surface being generally sized to cover the axial end of the pipe and substantially solid in a region opposing said end, the planar reference surface including a portion generally circular in circumferential shape and having a generally triangular attachment portion extending therefrom; and
- alignment means for aligning the reference surface perpendicular to an axis of the pipe, the alignment means being directly attached to and abutting the attachment portion of the planar reference surface; the alignment means including at least two spaced apart generally parallel support edges with an unobstructed spacing therebetween to accommodate one of a plurality of pipes of different diameter laying against said edges; said method including positioning said apparatus so that the alignment means is parallel to the axis of the pipe and the reference surface abuts the axial end of the pipe;
- inspecting the gaps and variations between the axial end of the pipe and the circular portion of the reference surface; and
- trimming the axial end until there are no gaps between the reference surface and the axial end of the pipe.

* * * * *